United States Patent Office 2,978,296
Patented Apr. 4, 1961

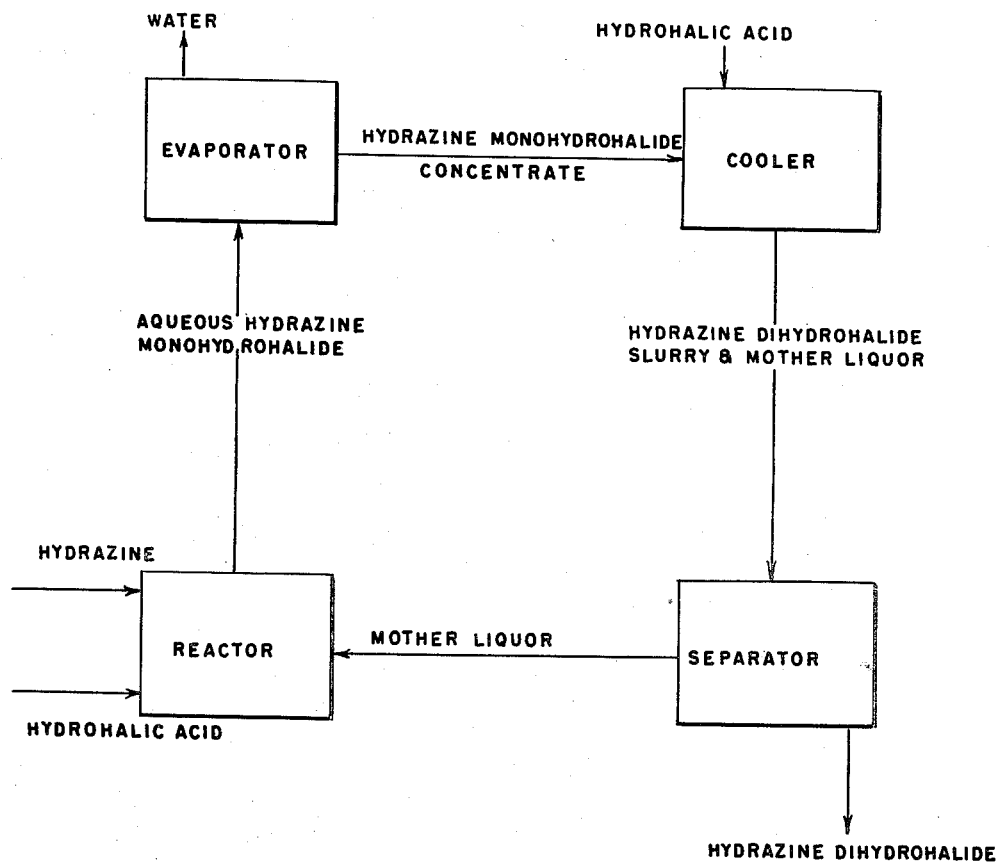

2,978,296

MANUFACTURE OF HYDRAZINE DIHYDROHALIDES

Bernard H. Nicolaisen, Tonawanda, and Richard C. Harshman, Kenmore, N.Y., assignors to Olin Mathieson Chemical Corporation, a corporation of Virginia Filed Sept. 22, 1958, Ser. No. 762,315

5 Claims. (Cl. 23—87)

This invention relates to improvements in the manufacture of hydrazine dihydrohalides.

Hydrazine dihydrochloride finds use in copper and brass cleaning compositions, as a chlorine scavenger in hydrogen chloride gas, and as a chemical intermediate in, for example, the preparation of 3,6-dihydroxypyridazine as described in J. Am. Chem. Soc., 73, 1873–4 (1951). Hydrazine dihydrofluoride and hydrazine dihydrobromide are useful in soldering flux compositions.

Solid hydrazine dihydrohalides are stable except at elevated temperatures where they dissociate into the hydrazine monohydrohalide and hydrogen halide. In water, they are quite soluble, though less so than the monohydrohalides. They are largely dissociated into hydrogen halide and monohydrohalide in aqueous solution. For these reasons, hydrazine dihydrochloride, for example, cannot be prepared satisfactorily by simply mixing a solution of hydrazine with a solution of hydrochloric acid and concentrating by evaporation. When this is attempted, hydrogen chloride is lost and hydrazine monohydrochloride or a mixture of mono and dihydrochloride is obtained as a solid product. The preparation of the dihydrohalides in an anhydrous way does not offer an economically feasible method of avoiding these difficulties due to the high cost of anhydrous hydrazine and hydrogen halides.

It has now been found that the problems posed in the production of hydrazine dihydrohalides by their solubility in water and their tendency at elevated temperatures to lose hydrogen halide and revert to the more stable hydrazine monohydrohalide can be overcome. This is accomplished by the cyclic process of the present invention which involves the steps of reacting hydrazine or hydrazine hydrate and aqueous hydrogen halide to produce aqueous hydrazine monohydrohalide, removing water from the aqueous hydrazine monohydrohalide thermally to produce a hydrazine monohydrohalide concentrate, cooling the hydrazine monohydrohalide concentrate and adding aqueous hydrogen halide to produce a slurry of hydrazine dihydrohalide crystals and a mother liquor, separating the hydrazine dihydrohalide crystals and the mother liquor, and adding sufficient hydrazine and aqueous hydrogen halide to the mother liquor to produce aqueous hydrazine monohydrohalide. Thus, the method of the present invention contemplates thermal removal of the water when the salt present in solution is the substantially more stable hydrazine monohydrohalide. By this means, losses of hydrogen halide are avoided. It also contemplates recovery of the desired hydrazine dihydrohalide by, for example, filtration or centrifuging when no heat is being applied which might cause hydrogen halide losses. For a better understanding of this see the attached schematic diagram.

More particularly, the hydrazine monohydrohalide liquor is evaporated to a concentration of about 25 to 60 percent and aqueous hydrogen halide is added to provide a molar ratio of acid to hydrazine of 2.05:1 to 2.5:1. The dihydrohalide liquor is cooled to crystallize solid dihydrohalide at a temperature of about 20° to 40° C. and the crystals are separated. The liquor is recycled and fortified by the addition of hydrazine and hydrohalogen acid in proportion to reconstitute the monohydrohalide liquor which is then evaporated as described.

In starting the cyclic process of the present invention, as applied to the production of hydrazine dihydrochloride, a preferred way of proceeding is to react hydrazine hydrate with sufficient hydrochloric acid to provide 1 mode of hydrogen chloride per mole of hydrazine. Water is then evaporated from the solution and, while cooling the resulting hydrazine monohydrochloride concentrate, additional hydrochloric acid is added to provide from about 2.05 to 2.5 moles of hydrogen chloride per mole of hydrazine. The excess of hydrogen chloride depresses the solubility of the desired hydrazine dihydrochloride salt. Cooling is continued, preferably to about 25° C. A slurry of hydrazine dihydrochloride forms and it is filtered. Since the mother liquor has substantially the composition of the precipitating crystals, except for water and excess hydrogen chloride, it is not essential that it be washed. On the other hand, it is advantageous to wash the crystals with, for instance, methanol to avoid caking problems. Water can be used to wash too, but care must be taken not to use too much. Then, the washings, if any, are combined with the mother liquor containing hydrazine dihydrochloride in solution and fresh hydrazine hydrate and hydrochloric acid are added to form a solution of hydrazine monohydrochloride. Thereafter, the solution is distilled, recovering methanol if it was used in a washing step, and further concentrated by the removal of water.

The evaporation may be carried out at atmospheric or under reduced pressure. It is advantageously discontinued before the concentration of the solution is such that hydrazine monohydrochloride would separate at the hydrazine dihydrochloride precipitation temperature. The evaporation is, preferably, continued until the solution contains approximately 55 percent by weight hydrazine monohydrochloride. At lower concentrations less hydrazine dihydrochloride will be formed in the crystalline state in the subsequent crystallization. At concentrations less than 25 percent by weight hydrazine monohydrochloride, uneconomically small amounts of crystals will be formed in each cycle. With more than about 60 percent by weight solids, too thick a slurry of crystals of hydrazine dihydrochloride could be formed in the crystallization step and the desired product might be contaminated with hydrazine monohydrochloride. For these reasons, the preferred concentration of hydrazine monohydrochloride following the evaporation step is about 50 to 60 percent by weight.

Upon cooling of the hydrazine monohydrochloride concentrate, additional hydrochloric acid is added to precipitate hydrazine dihydrochloride crystals. The cooling and addition of hydrochloric acid may be concurrent provided only that the cooling is sufficient to prevent loss of acid. Advantageously excess hydrochloric acid is added to depress the solubility of the hydrazine dihydrochloride. The molar ratio of HCl to hydrazine can be from about 2.05:1 to 2.5:1, but from about 2.05:1 to 2.25:1 is preferred in order to obtain the maximum effect on depression of solubility of the salt. This, in turn, gives the maximum recovery of hydrazine dihydrochloride per cycle.

Using aqueous hydrazine and aqueous hydrochloric acid as pure as are commercially available, substantially all of the hydrazine and hydrochloric acid are eventually recovered in the form of hydrazine dihydrochloride without appreciable losses. Using less pure reactants, it is desirable after several cycles to extend the evaporation step and recover solid hydrazine monohydrochloride by crystallization, discarding the impure mother liquor and re-dissolving the hydrazine monohydrochloride for recycle.

Hydrazine may be introduced into the system as anhydrous hydrazine, but it is more advantageous economically to use hydrazine hydrate or commercially available compositions approximating such proportions. Even more dilute solutions of hydrazine may be charged but this increases the load on the evaporator. Thus, hydrazine hydrate of commerce is the preferred starting material for this reactant.

Concentrated acids are preferably used, although more dilute acids can be used and the water subsequently evaporated from the hydrazine monohydrohalide solution.

The acid used should preferably be pure. Commercial muriatic acid, for example, may contain sufficient quantities of iron and other contaminants to produce an impure product and even to cause decomposition and loss of hydrazine.

Example I

In a 50 gallon glass lined steel kettle, 75 pounds of 54.4 percent hydrazine solution was neutralized by the slow addition, with agitation and cooling, of 133 pounds of 35 percent hydrochloric acid. The resulting solution of hydrazine monohydrochloride having a pH of about 4.5 was heated and 52 pounds of water were evaporated. The solution was then cooled and 140 pounds of 35 percent hydrochloric acid was added with agitation and cooling. The resulting slurry of hydrazine dihydrochloride crystals was centrifuged and washed with 20 gallons of methanol. It was vacuum dried at about 60° C. to obtain 100 pounds of dry product. The yield was 75 percent based on the hydrazine charged.

The mother liquor and washings from the preceding step were combined in a 50 gallon glass lined kettle, 56 pounds of 54.4 percent hydrazine solution was added with agitation and cooling. 59 pounds of 35 percent hydrochloric acid was added with agitation and cooling. The mixture was heated to distill off methanol and water. After all of the methanol and 155 pounds of water were removed, the solution was cooled and 140 pounds of 35 percent hydrochloric acid was added with cooling and agitation. The product was crystallized, filtered, washed and dried as in the preceding step to obtain an additional 100 pounds of dry hydrazine dihydrochloride.

Example II

To a 1000 gallon reactor was charged a mother liquor from a previous preparation of hydrazine dihydrochloride containing 116 pounds of hydrazine, 515 pounds of hydrogen chloride and 2546 pounds of water. To this was added, with agitation, 822 pounds of 64 percent by weight hydrazine solution and 597 pounds of 36 percent hydrochloric acid. The mixture was distilled to remove 2101 pounds of water and the resulting solution of hydrazine monohydrochloride was transferred to another reactor where an additional 2836 pounds of 36 percent hydrochloric was added with agitation and cooling. Hydrazine dihydrochloride crystallized out and was removed by filtration. It amounted to 1724 pounds of dry salt. The resulting filtrate was recycled with additional hydrazine hydrate and hydrochloric acid to form additional hydrazine dihydrochloride.

Example III

A 250 gallon, jacketed, agitated, nickel reactor was charged with 1000 pounds of water and 308 pounds of 70 percent aqueous hydrofluoric acid. The hydrofluoric acid was added under a nitrogen atmosphere to minimize possible corrosion of the reactor. Aqueous hydrazine (540 pounds of 64 percent $N_2H_4$ solution) was added slowly with cooling and agitation. The rate of addition was controlled to maintain the temperature below 50° C. Water (248 pounds) was then evaporated from the solution and the solution was cooled to 25° C. and an additional 370 pounds of 70 percent aqueous hydrofluoric acid was added with cooling and agitation, at such a rate as to maintain the temperature below 25° C. After all of the hydrofluoric acid had been added, the slurry was cooled to 19° C. and the crystals were separated by centrifugation. The wet crystals from the centrifuge (652 pounds wet weight) were dried without washing and yielded 601 pounds of product. The mother liquor (1325 pounds) was again charged to the same reactor and first 110 pounds of 70 percent hydrofluoric acid and then 418 pounds of 64 percent hydrazine solution were added. Agitation and cooling was maintained during additions and in all cases the addition was controlled to keep the temperature at about 50° C. After the addition of hydrazine was completed, 245 pounds of water were evaporated under vacuum, maintaining the temperature in the kettle at about 50° C. The solution was cooled to 25° C. and, as in the first cycle, 370 pounds of 70 percent hydrofluoric acid was added, and the product was crystallized, centrifuged, and dried. The yield of product was 598 pounds. Mother liquor from this centrifugation was used for recycle as above.

What is claimed is:

1. A process for the production of hydrazine dihydrohalides comprising the steps of reacting a member selected from the group consisting of hydrazine and aqueous solutions of hydrazine with an aqueous hydrogen halide to produce hydrazine monohydrohalide, removing water from the aqueous hydrazine monohydrohalide thermally to produce a concentrate containing about 25 to 60 percent by weight of hydrazine monohydrohalide, then cooling said concentrate and adding aqueous hydrogen halide to the said concentrate, said addition being sufficient to produce a slurry of hydrazine dihydrohalide crystals and a mother liquor, said cooling being sufficient to prevent loss of hydrogen halide from said cooled product, the slurry having a molar ratio of hydrazine to hydrogen halide of from about 1:2.05 to 1:2.5, separating the hydrazine dihydrohalide crystals and the mother liquor, and recycling the mother liquor to the first step.

2. The process of claim 1 in which the hydrogen halide is hydrogen chloride.

3. The process of claim 1 in which the hydrogen halide is hydrogen bromide.

4. The process of claim 1 in which the hydrogen halide is hydrogen fluoride.

5. A process for the production of hydrazine dihydrochloride comprising the steps of reacting a member selected from the group consisting of hydrazine and aqueous solutions of hydrazine with hydrochloric acid to produce aqueous hydrazine monohydrochloride, removing water from the aqueous hydrazine monohydrochloride thermally to produce a concentrate containing about 50 to 60 percent by weight of hydrazine monohydrochloride, then cooling the said concentrate and adding aqueous hydrochloric acid to the said concentrate, said addition being sufficient to produce a slurry of hydrazine dihydrochloride crystals and a mother liquor, said cooling being sufficient to prevent loss of hydrogen chloride from said cooled product, the slurry having a molar ratio of hydrazine to hydrogen halide of from about 1:2.05 to 1:2.5, separating the hydrazine dihydrochloride crystals and the mother liquor at a temperature of from about 20° C. to 40° C. and recycling the mother liquor to the first step.

References Cited in the file of this patent

Curtius et al.: "Journal für Praktische Chemie, Band 42 (New Series), pages 534–36 (1890), Verlag Barth, Leipzig, Germany.

Mellor: "Comprehensive Treatise on Inorganic and Theoretical Chemistry," vol. 8, pp. 323–24 (1928), Longmans, Green and Co., N.Y.

Audrieth et al.: "The Chemistry of Hydrazine," page 173 (1951), John Wiley and Sons, N.Y.